United States Patent [19]

Brackett

[11] Patent Number: 5,417,309
[45] Date of Patent: May 23, 1995

[54] LUBRICATION SYSTEM FOR A CONJUGATE DRIVE MECHANISM

[76] Inventor: Douglas C. Brackett, P.O. Box 306, Portland, Me. 04112

[21] Appl. No.: 149,064

[22] Filed: Nov. 8, 1993

[51] Int. Cl.$^6$ ............................................. F01M 1/04
[52] U.S. Cl. ...................................... 184/6.5; 92/157; 184/6.6; 74/50; 123/55.3
[58] Field of Search ..................... 92/157; 184/6.5, 6.6; 74/50; 123/197.4, 56 AC, 56 BC

[56] References Cited

U.S. PATENT DOCUMENTS

| | | |
|---|---|---|
| 130,371 | 8/1872 | Hendryx . |
| 139,499 | 6/1873 | Doolittle . |
| 283,558 | 8/1883 | Baumgarten . |
| 347,644 | 8/1886 | Salmon . |
| 410,432 | 8/1889 | McKaig . |
| 637,450 | 11/1899 | Doolittle . |
| 762,646 | 6/1904 | Morison . |
| 813,736 | 2/1906 | Pendleton . |
| 999,220 | 8/1911 | Harmon . |
| 1,508,614 | 9/1924 | Powell ........................ 74/50 |
| 2,121,214 | 6/1938 | Vandervoort . |
| 2,312,057 | 2/1943 | Williams . |
| 2,330,552 | 9/1943 | Brooks . |
| 2,357,247 | 8/1944 | Wilkinson .................. 74/50 |
| 2,628,602 | 2/1953 | Butterfield . |
| 3,205,723 | 9/1965 | Erlenbach ................... 74/50 |
| 3,365,913 | 1/1968 | Shields . |
| 3,415,138 | 12/1968 | Bumbarger et al. . |
| 3,424,022 | 1/1969 | Greenberg et al. . |
| 3,789,956 | 2/1974 | Neugebauer . |
| 3,822,607 | 7/1974 | Tharaldsen . |
| 4,270,395 | 6/1981 | Grundy . |
| 4,355,542 | 10/1982 | Tsutsumi et al. . |
| 4,370,901 | 2/1983 | Bolen . |
| 4,570,505 | 2/1986 | Peterson . |
| 4,573,373 | 3/1986 | Shimizu et al. . |
| 4,590,812 | 5/1986 | Brackett . |
| 4,598,672 | 7/1986 | Jayne et al. .................. 123/56 BC |
| 4,685,342 | 8/1987 | Brackett . |
| 4,696,201 | 9/1987 | Hattori et al. . |
| 4,741,220 | 5/1988 | Watanabe et al. . |
| 4,776,229 | 10/1988 | Zona . |
| 4,779,472 | 10/1988 | Brackett . |
| 4,884,536 | 12/1989 | Neale et al. . |
| 4,905,535 | 3/1990 | Ludwig et al. . |
| 4,979,427 | 12/1990 | Pfeffer et al. . |
| 5,090,265 | 2/1992 | Slocum . |
| 5,259,256 | 11/1993 | Brackett . |

FOREIGN PATENT DOCUMENTS 3607422  9/1987  Germany ...................... 123/197.4

Primary Examiner—Thomas E. Denion
Attorney, Agent, or Firm—Ralph W. Selitto, Jr.

[57] ABSTRACT

A conjugate drive mechanism of a scotch yoke type motion converter includes a conjugate driver, which is rotatably mounted on a crankpin, and a bearing conjugate, which is mounted on a linearly movable shuttle. The conjugate drive mechanism is lubricated by supplying lubricating fluid from a pressurized source to an interface between meshing portions of the bearing conjugate and the conjugate driver.

41 Claims, 8 Drawing Sheets

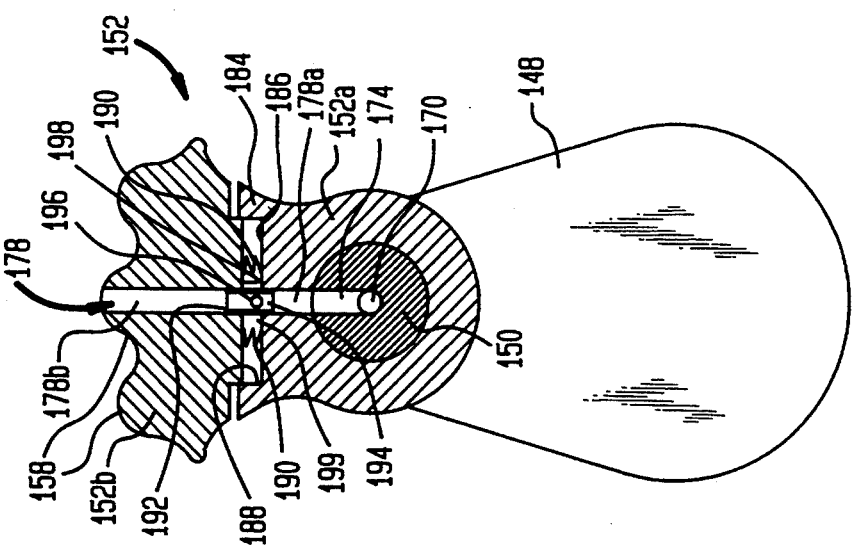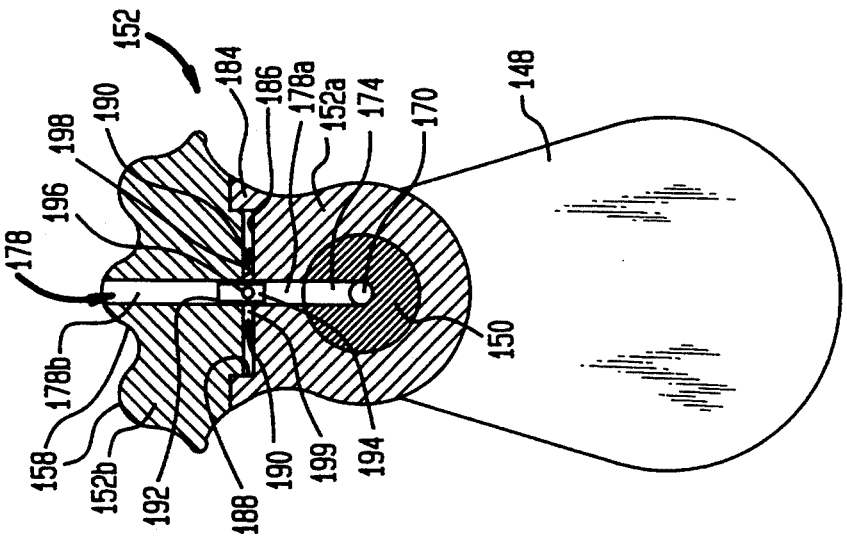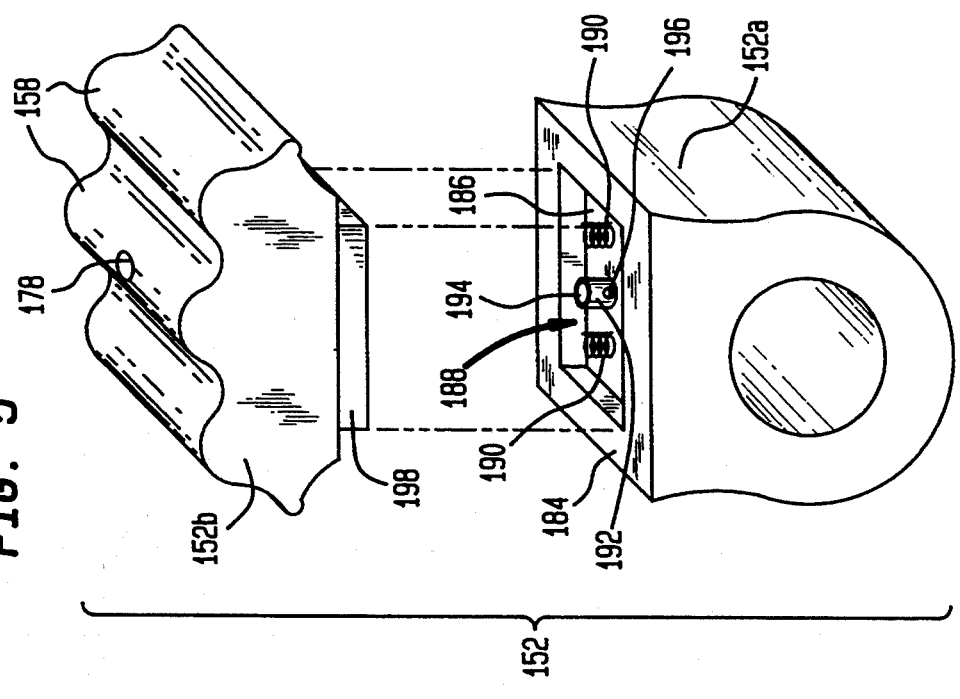

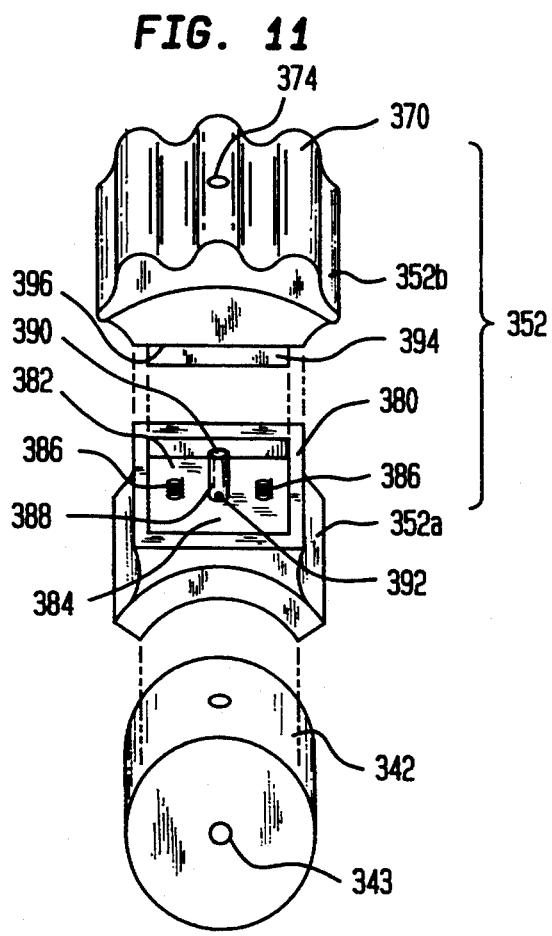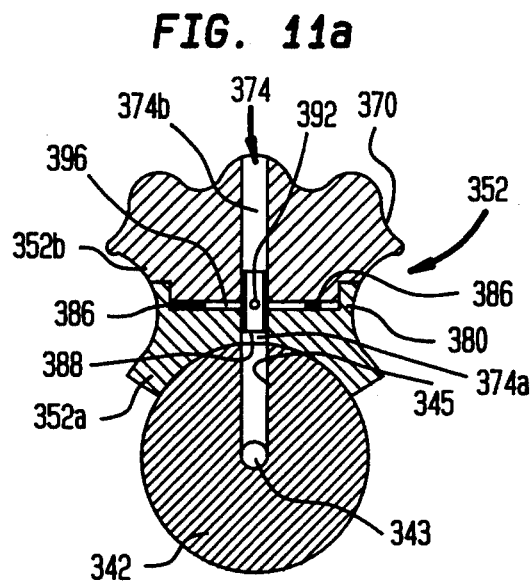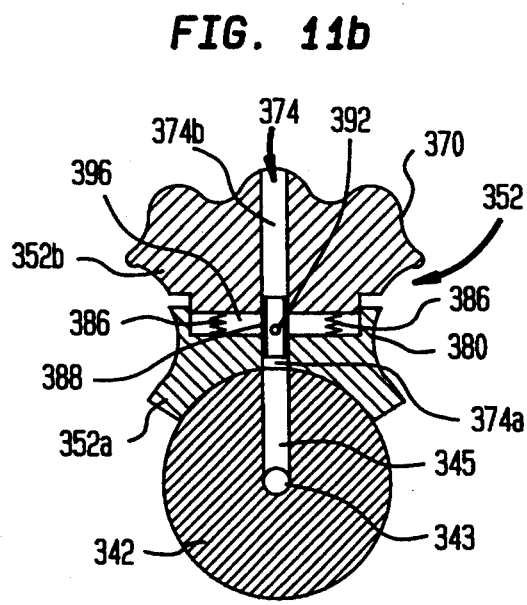

LUBRICATION SYSTEM FOR A CONJUGATE DRIVE MECHANISM

FIELD OF THE INVENTION

The present invention relates to lubrication systems for a motion converter, and, more particularly, to lubrication systems for lubricating a conjugate drive mechanism of a scotch yoke type motion converter. As used herein, the term "conjugate drive mechanism" shall connote a combination of at least two mechanical components (i.e., a "conjugate driver" and a "bearing conjugate") adapted to mesh or engage in conjugation with each other, such as through the provision of meshable tracking profiles (i.e., undulations), during the operation of an associated motion converter which functions to convert rotary motion to rectilinear motion and vice versa.

BACKGROUND OF THE INVENTION

The scotch yoke has been used for many years as a means for converting reciprocating linear movement to rotary motion and vice versa. It has found application in a variety of machines, such as motors, pumps, and compressors which utilize a piston articulated within a closed cylinder (see, e.g., U.S. Pat. Nos. 283,558; 813,736; 999,220; and 2,628,602), as well as in compactors, pumps, punch presses, robots, sewing machines, generators, and material handlers.

The essential components of a scotch yoke are a crankpin rotated about a crankshaft center at an axial offset and a shuttle having a slot therein through which the crankpin is positioned. The motion of the shuttle is constrained to a linear path by a guide, frequently, a pair of opposing parallel guide surfaces. The crankshaft and crankpin move in rotary motion and may be either the driven elements or the driving elements. The shuttle moves in rectilinear motion and likewise may be the driven element or the driving element. Thus, the scotch yoke provides a means for converting linear to rotary motion and vice versa.

The slot within the shuttle must be at least as wide as the crankpin diameter and long enough to accommodate the crankpin dimension and its travel. A pair of competing objectives in the design of scotch yokes is to eliminate friction, as well as clearance at the crankpin/slot interface. Friction results in energy loss in the conversion from linear to rotary motion or vice versa and also in wear of the scotch yoke. Clearance at the interface results in a loss of motion translation, commonly called "backlash", when converting from rotary to linear motion and vice versa (i.e., there is no translation during traversal of the clearance gap), and in brinelling, spalling and vibrations when the unrestrained driving element accelerates across the clearance gap and collides into the driven element. As has been recognized for many years, the consequences of clearance and friction at the slot/crankpin interface are energy inefficiency and excessive wear and tear.

U.S. Pat. No. 4,685,342 to Douglas C. Brackett, the inventor herein, discloses a unique scotch yoke device having a pair of opposing, offset bearing conjugates, one on either side of the crankpin slot in the shuttle. A corresponding pair of conjugate drivers is arranged on the crankpin, the conjugate drivers being coaxially and laterally displaced from one another such that each aligns with a corresponding one of the bearing conjugates. Tracking profiles on the conjugate drivers and mating profiles on the bearing conjugates mesh in conjugation throughout the motion of the device; and, thus, the conjugate drivers cooperate with the bearing conjugates to form a "conjugate drive mechanism" as that term is defined herein. While the device disclosed in the Brackett '342 Patent minimizes clearance at the crankpin/slot interface to that attributable to manufacturing tolerances and also reduces friction between the crankpin and the shuttle slot to the rolling friction of a roller bearing, these advantages are realized without the benefit of a lubrication system for the conjugate drive mechanism.

U.S. Pat. No. 2,628,602 to Butterfield discloses a double-ended piston having means for lubricating the interface between a crankpin and a bearing member, as well as the interface between the bearing member and a slideway of the piston. The bearing member and the slideway do not, however, cooperate to form a "conjugate drive mechanism" as that term is defined herein; and, therefore, the lubricating means of the Butterfield '602 Patent is not employed to lubricate such a mechanism.

SUMMARY OF THE INVENTION

The present invention relates to a lubrication system for a conjugate drive mechanism of a scotch yoke type motion converter which includes a rotatable crankshaft having a crankpin, a conjugate driver rotatably mounted on the crankpin, and a bearing conjugate mounted on a linearly movable shuttle such that the bearing conjugate is in continuous meshing engagement with the conjugate driver as the crankpin rotates, whereby motion is transferable between the crankpin and the shuttle. The lubrication system, which may, for example, include a gallery extending through the crankpin and a passageway extending through the conjugate driver, functions to convey lubricating fluid from a source of pressurized lubricating fluid to an interface between the bearing conjugate and the conjugate driver. In addition to reducing friction between the bearing conjugate and the conjugate driver, the lubricating fluid also minimizes backlash by creating a thin film of lubricating fluid between the conjugate driver and the bearing conjugate, whereby the present invention enhances the energy efficiency and wear resistance properties of the conjugate drive mechanism.

BRIEF DESCRIPTION OF THE DRAWINGS

For a better understanding of the present invention, reference is made to the following description of various exemplary embodiments of the invention considered in conjunction with the accompanying drawings, in which:

FIG. 5 is an exploded, perspective view of a modified version of the first exemplary embodiment shown in FIGS. 1-4b;

FIG. 5a is a cross-sectional view of the modified version of FIG. 5 in a retracted position;

FIG. 5b is a cross-sectional view of the modified version of FIG. 5 in an extended position;

FIG. 11 is an exploded, perspective view of a modified version of the second exemplary embodiment shown in FIGS. 6-10;

FIG. 11a is a cross-sectional view of the modified version of FIG. 11 in a retracted position; and FIG. 11b is a cross-sectional view of the modified version of FIG. 11 in an extended position.

DESCRIPTION OF THE EXEMPLARY EMBODIMENTS

Although the present invention can be used with any conjugate drive mechanism, it is particularly suitable for use in connection with conjugate drive mechanisms adapted for use in the scotch yoke type of motion converters disclosed in Brackett U.S. Pat. No. 4,685,342 and in applicant's copending U.S. patent application Ser. No. 07/924,547, filed Jul. 31, 1992. Accordingly, the present invention will be described hereinafter in connection with conjugate drive mechanisms adapted for use in combination with such motion converters. It should be understood, however, that the following description is only meant to be illustrative of the present invention and is not meant to limit the scope of the present invention, which has applicability to other types of motion converters.

Figure 1:
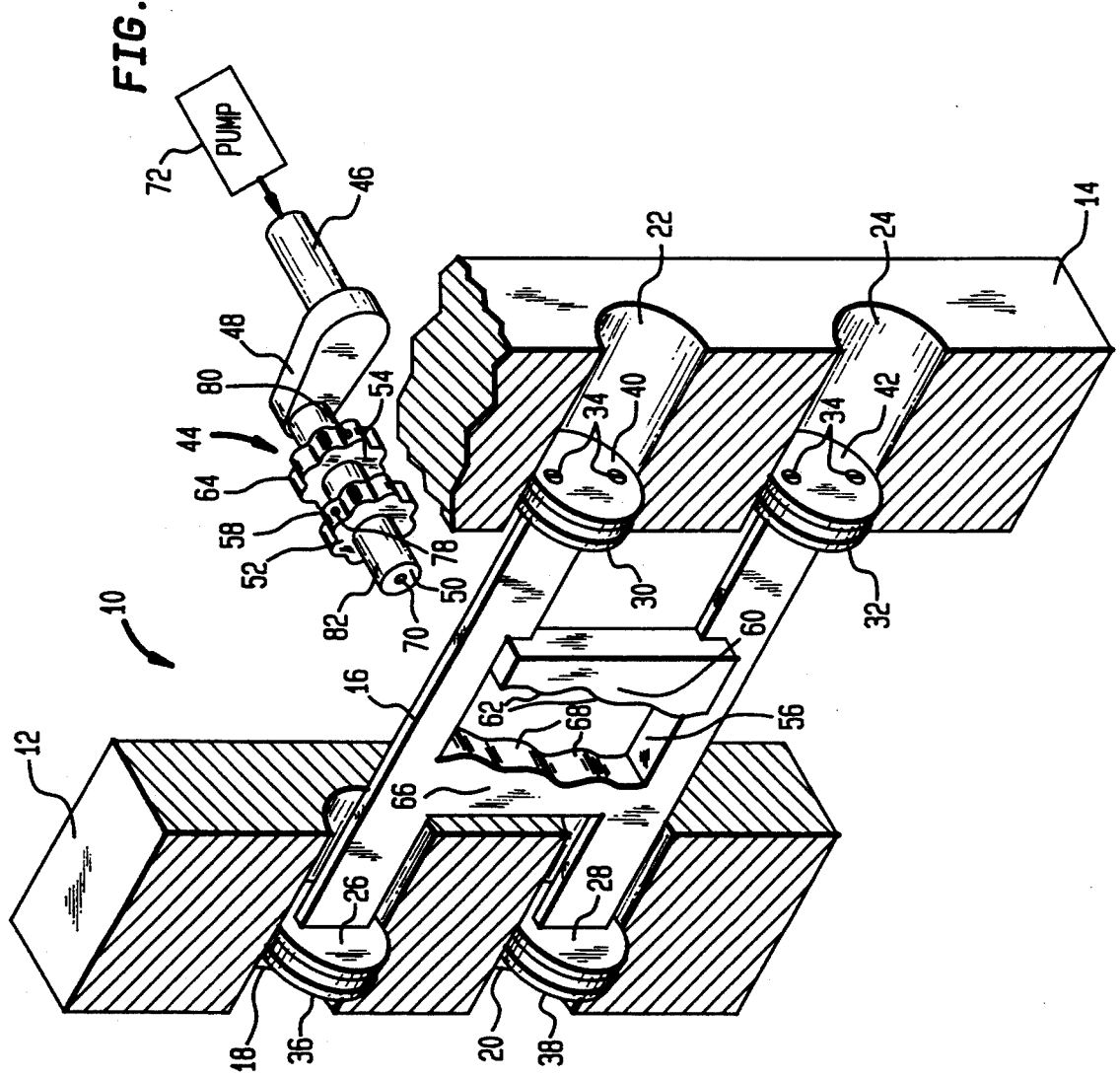
FIG. 1 is an exploded perspective view of a piston engine incorporating a motion converter which is equipped with a first exemplary embodiment of a lubrication system constructed in accordance with the present invention.

FIG. 1 shows a piston engine 10 constructed in accordance with the teachings of Brackett U.S. Pat. No. 4,685,342, the specification of which is incorporated herein by reference. The piston engine 10 includes a pair of cylinder blocks 12, 14 and a piston shuttle 16. The cylinder block 12 is provided with a pair of cylinders 18, 20, while the cylinder block 14 is provided with a pair of cylinders 22, 24. The shuttle 16 includes a first pair of pistons 26, 28 mounted for reciprocating linear motion in the cylinders 18, 20, respectively, and a second pair of pistons 30, 32 mounted for reciprocating linear motion in the cylinders 22, 24, respectively. The pistons 26, 28, 30, 32 are fastened to the shuttle 16, by screws 34, which are threadedly received in holes (not shown) provided in faces 36, 38, 40, 42 of the pistons 26, 28, 30, 32, respectively, and extending into the shuttle 16.

A crank 44 is operatively associated with the shuttle 16. More particularly, the crank 44 includes a crankshaft 46, a crankarm 48 mounted for conjoint rotation with the crankshaft 46, and a crankpin 50 mounted for conjoint rotation with the crankshaft 46, the crankpin 50 and the crankshaft 46 being offset relative to each other. Conjugate drivers 52, 54 are rotatably mounted on the crankpin 50, which extends through a slot 56 provided in the shuttle 16 such that the conjugate driver 52, which includes a circumferential tracking profile (i.e., undulations) 58, is in constant engagement with a bearing conjugate 60, which includes a circumferential mating profile (i.e., undulations) 62, located on one side of the shuttle 16 and such that the conjugate driver 54, which includes a circumferential tracking profile (i.e., undulations) 64, is in constant engagement with a bearing conjugate 66, which includes a circumferential mating profile (i.e., undulations) 68, located on an opposite side of the shuttle 16. The conjugate drivers 52, 54 and the bearing conjugates 60, 66, respectively, mesh together in conjugation throughout the range of motion of the piston engine 10; and, thus, they cooperate to form a conjugate drive mechanism as that term is defined herein.

Figure 2:
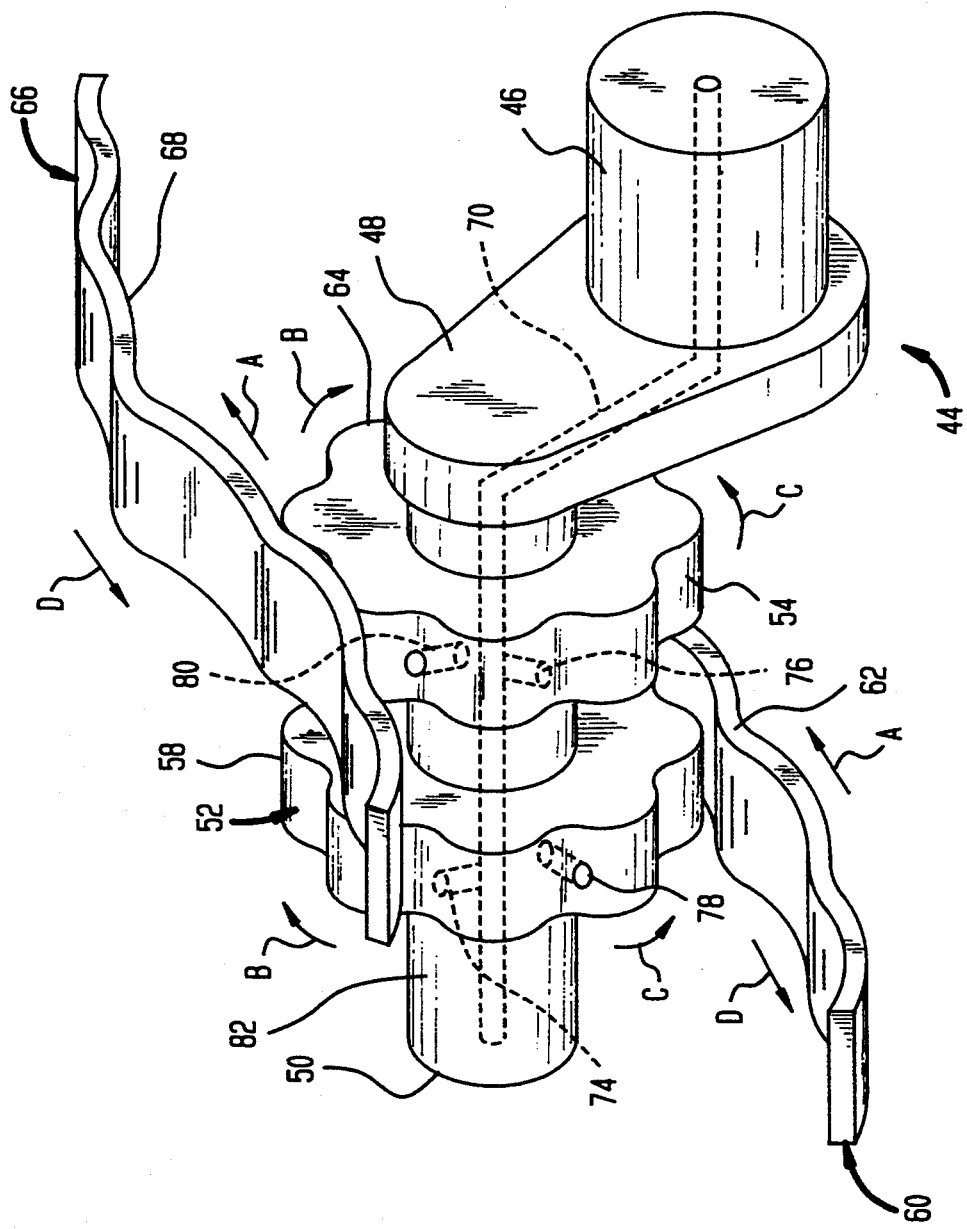
FIG. 2 is an enlarged perspective view of a portion of the motion converter shown in FIG. 1.

Referring to FIG. 1, in general, and to FIG. 2, in particular, the crankpin 50 includes a gallery 70 which extends longitudinally therethrough and which forms a conduit for lubricating fluid supplied under pressure from a source, such as a pump 72. The crankpin 50 has bores 74, 76 communicating with the gallery 70 and extending radially outwardly therefrom. The conjugate drivers 52, 54 include orifices 78, 80, respectively, extending therethrough. The orifices 78, 80 are positioned such that they are alignable with the bores 74, 76, respectively, as the crankpin 50 rotates.

In operation, as the pistons 26, 28, 30, 32 reciprocate linearly in the cylinders 18, 20, 22, 24, respectively, the conjugate drivers 52, 54 move back and forth along the bearing conjugates 60, 66, respectively. More particularly, as the conjugate drivers 52, 54 move in conjugation (i.e., mesh) along the bearing conjugates 60, 66, respectively, in a first direction (indicated by arrows A in FIG. 2), the conjugate driver 52 rotates in one arcuate direction (indicated by arrows B in FIG. 2) and the conjugate driver 54 rotates in an opposite arcuate direction (indicated by arrows C in FIG. 2). As the conjugate drivers 52, 54 move along the bearing conjugates 60, 66, respectively, in a second direction (indicated by arrows D in FIG. 2), the conjugate driver 52 rotates in the arcuate direction indicated by the arrows C and the conjugate driver 54 rotates in the arcuate direction indicated by the arrows B. Because the conjugate drivers 52, 54 are in constant engagement with the bearing conjugates 60, 66, respectively, as the conjugate drivers 52, 54 move back and forth along the bearing conjugates 60, 66, respectively, the linear motion of the shuttle 16 is continuously converted into the rotary motion of the crank 44 to thereby reduce backlash.

Referring to FIGS. 3a-4b, as the conjugate drivers 52, 54 move along the bearing conjugates 60, 66, respectively, the lubricating fluid traveling through the gallery 70 (as indicated by arrows E in FIGS. 4a and 4b) is diverted to an outer surface 82 of the crankpin 50 through the bores 74, 76 (as indicated by arrow H in FIG. 4b and by Arrow F in FIG. 4a, respectively) and lubricates the interface between the crankpin 50 and the conjugate drivers 52, 54. As the conjugate drivers 52, 54 continue their motion, the orifice 78 of the conjugate driver 52 comes into alignment with the bore 74 in the crankpin 50 (see FIGS. 3a and 4a), whereby lubricating fluid flows from the bore 74 through the orifice 78 (as indicated by arrow G in FIG. 4a) and into the interface between the tracking profile 58 of the conjugate driver 52 and the mating profile 62 of the bearing conjugate 60 (not shown in FIGS. 3a-4b). As the conjugate drivers 52, 54 continue their motion, the bore 76 in the crankpin 50 comes into alignment with the orifice 80 of the conjugate driver 54 (see FIGS. 3b and 4b), whereby lubricating fluid flows from the bore 76 through the orifice 80 (as indicated by arrow I in FIG. 4b) and into the interface between the tracking profile 64 of the conjugate driver 54 and the mating profile 68 of the bearing conjugate 66 (not shown in FIGS. 3a–4b).

The lubrication system described hereinabove reduces friction at the interface between the conjugate drivers 52, 54 and the bearing conjugates 60, 66, respectively, and between the crankpin 50 and the conjugate drivers 52, 54. It should be appreciated that the lubrication system also contributes in minimizing backlash by creating a thin film of lubricating fluid between the conjugate drivers 52, 54 and the bearing conjugates 60, 66, respectively, thereby compensating for inadvertent gaps and spaces resulting from manufacturing tolerances and/or wear and tear of the conjugate drive mechanism.

Figure 3B:
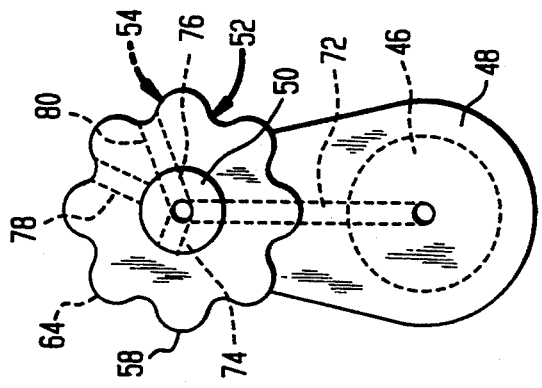
FIGS. 3a and 3b are a series of schematic front elevational views of the first exemplary embodiment as the motion converter of FIGS. 1 and 2 is moved through a portion of its range of motion.
Figure 4B:
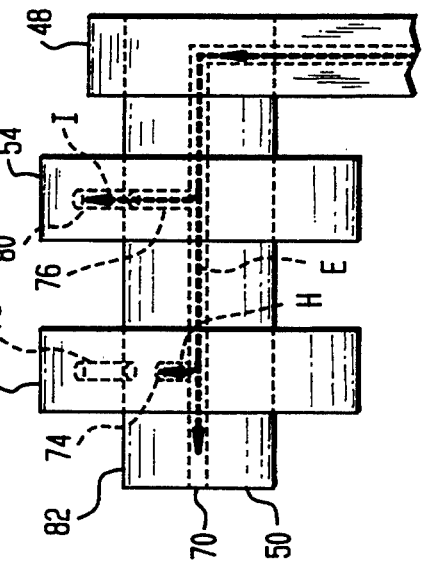
FIGS. 4a and 4b are a series of schematic side elevational views of the first exemplary embodiment which correspond to FIGS. 3a and 3b, respectively.
Figure 3A:
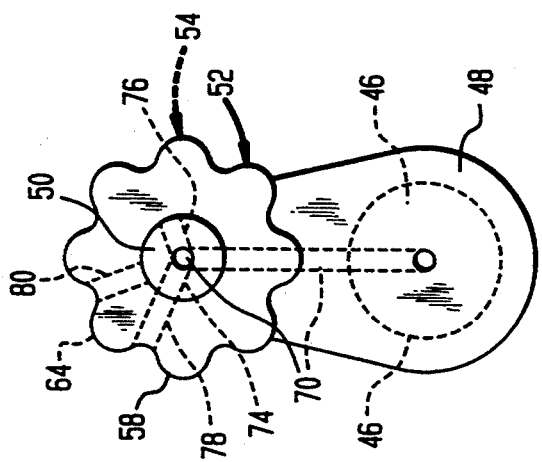
Figure 4A:
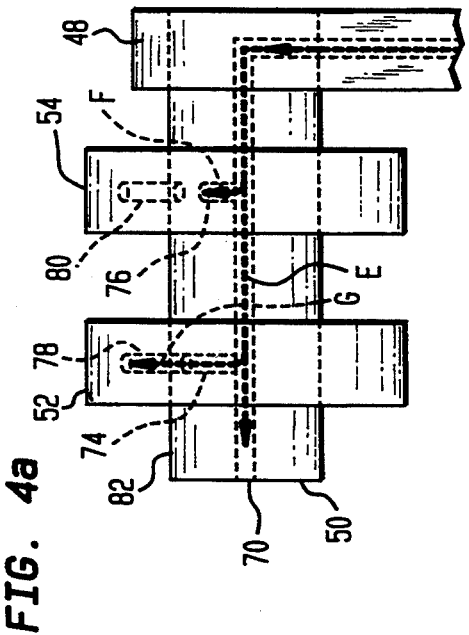

The lubrication system described hereinabove can be configured in various alternative ways. For example, the orifices 78, 80 may communicate with peaks of the undulations of the tracking profiles 58, 64, rather than with their valleys as shown in FIGS. 3a and 3b. In addition, the lubrication system can be configured in such a way that a continuous, rather than intermittent, flow of lubricating fluid is provided to the interfaces between the conjugate drivers 52, 54 and the bearing conjugates 60, 66, respectively, or in such a way that the interface between the conjugate driver 52 and the bearing conjugate 60 and the interface between the conjugate driver 54 and the bearing conjugate 66 are lubricated simultaneously, rather than sequentially.

FIGS. 5–5b depict a modified version of the lubrication system illustrated in FIGS. 1–4b. In FIGS. 5–5b, a numbering convention is employed wherein elements shown therein having a function or structure in common with a counterpart in previously discussed FIGS. 1–4b are given the same number incremented by a hundred.

Referring to FIGS. 5–5b, a conjugate driver 152 is divided into a lower member 152a and an upper member 152b. The lower member 152a is rotatably mounted on a crankpin 150. The lower member 152a has a peripheral wall 184 which extends beyond an upper surface 186 of the lower member 152a to form a socket 188. Springs 190 and a tubular nipple 192 project from the upper surface 186 within the socket 188 for purposes to be described hereinafter. As can be seen in FIG. 5, the nipple 192, which is fixedly mounted in a lower portion 178a of an orifice 178, includes an axial bore 194 and a plurality of radial holes 196 (only one of which is visible in FIG. 5) whose functions will also be described hereinafter.

The upper member 152b has a solid plug 198 which depends therefrom. The plug 198 has a size and shape which complements those of the socket 188, whereby the plug 198 is slidably received within the socket 188 with sidewalls of the plug 198 being in sealing (i.e., fluid-tight) engagement with the peripheral wall 184 of the lower member 152a. An upper portion 178b of the orifice 178 extends through the upper member 152b, including the plug 198. The upper portion 178b of the orifice 178 is sized and shaped such that it slidably receives the nipple 192 of the lower member 152a (see FIG. 5).

As can be seen in FIG. 5a, the plug 198 has a height which is slightly less than the depth of the socket 188. Thus, when the plug 198 is in its fully retracted position within the socket 188 as shown in FIG. 5a, the plug 198 does not "bottom out" on the upper surface 186 of the lower member 152a; but, rather, the plug 198 is suspended above the upper surface 186 to create a space 199 which is in communication with the radial holes 196 of the nipple 192 for a purpose to be described hereinafter. The space 199 also accommodates the springs 190, which are fully compressed by the plug 198 when it is in its fully retracted position as shown in FIG. 5a.

As the conjugate driver 152 rotates about the crankpin 150, the springs 190 constantly urge the upper member 152b of the conjugate driver 152 against an associated bearing conjugate (not shown). Unlike the conjugate driver 52 shown in FIGS. 1–3b which has a tracking profile on its entire circumference, the conjugate driver 152 has a tracking profile 158 on only a portion of its circumference, provided that the conjugate driver 152 makes less than a complete revolution while moving along its associated bearing conjugate. More particularly, the tracking profile 158 is provided on that portion of the conjugate driver 152 which actually engages the associated bearing conjugate. Preferably, the total perimetrical length of the tracking profile 158 should be substantially equal to the length of the associated bearing conjugate.

If the conjugate driver 152 becomes worn, the springs 190 function to move the upper member 152b from its retracted position depicted in FIG. 5a toward its extended position depicted in FIG. 5b, thereby compensating for such wear and, as a result, reducing backlash and scuffing. As the pressurized lubricating fluid flows from the lower portion 178a of the orifice 178 to the upper portion 178b of the orifice 178 via the nipple 192, a portion of the pressurized lubricating fluid is diverted into the space 199 through the radial holes 196 to thereby assist the springs 190 in urging the upper member 152b against its associated bearing conjugate. To maximize the force of the pressurized lubricating fluid, it may be desirable to provide an annular sealing member (not shown) between the sidewalls of the plug 198 and the peripheral wall 184 of the lower member 152a and/or to provide for a continuous flow of lubricating fluid through the orifice 178 and, hence, to the space 199. Furthermore, the lubrication system could be configured in such a way that a continuous flow of lubricating fluid is supplied to the space 199, while lubricating fluid is intermittently supplied to the interface between the conjugate driver 152 and the associated bearing conjugate. If the lubricating fluid is continuously supplied to the space 199 at a high enough pressure, then the springs 190 could be eliminated.

It should be noted that the relative movement between the upper member 152b and the lower member 152a can be achieved in various ways. For example, magnetic and/or pneumatic means may be employed in conjunction with or instead of the springs 190 and/or the pressurized lubricating fluid (i.e., the hydraulic urging means). Furthermore, the associated bearing conjugate, instead of or in addition to the conjugate driver 152, could be divided into a pair of members, one of which would have a mating profile and would be movable relative to the other member.

Figure 6:
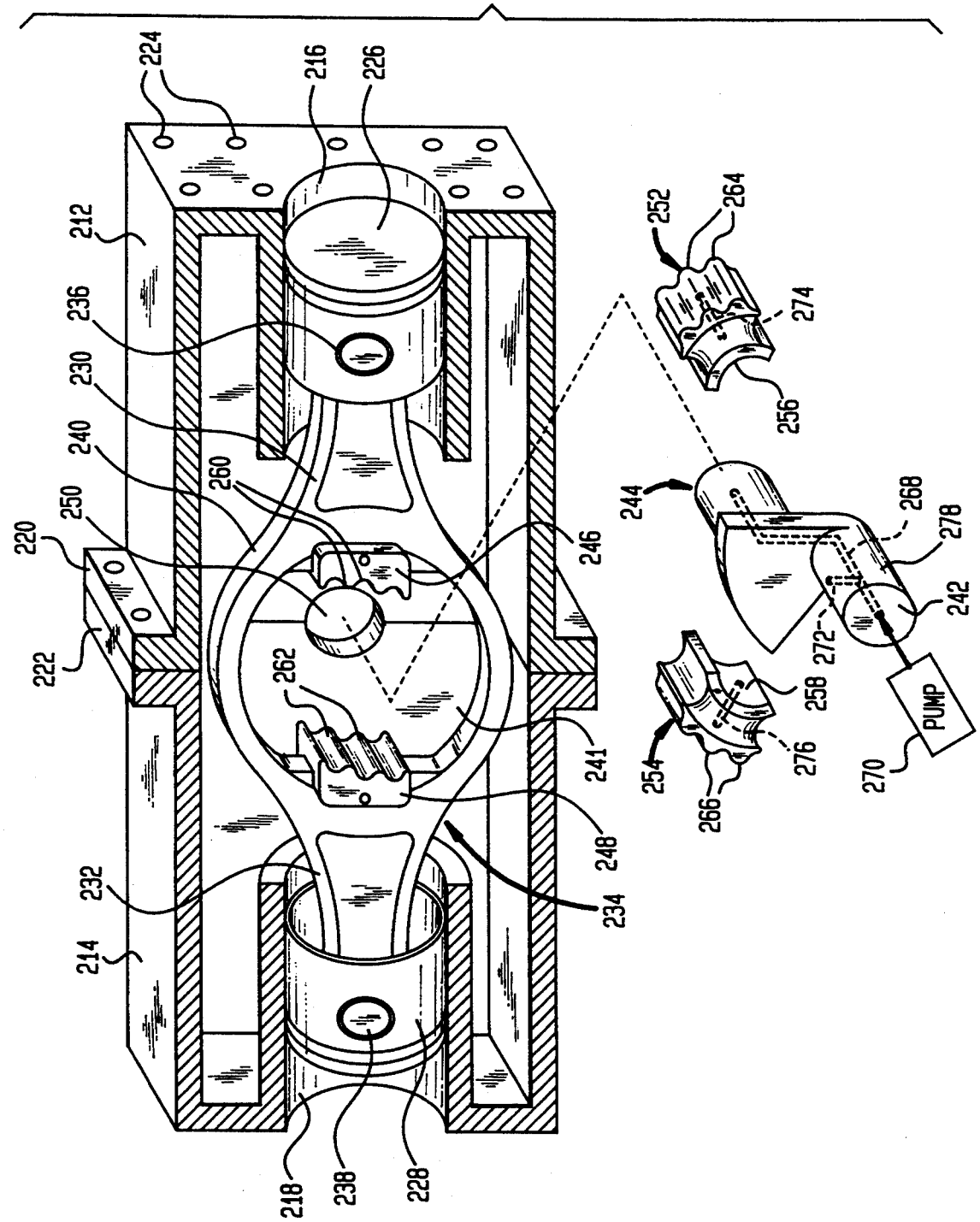
FIG. 6 is an exploded perspective view of a reciprocating piston device incorporating a motion converter which is equipped with a second exemplary embodiment of a lubrication system constructed in accordance with the present invention.
Figure 7:
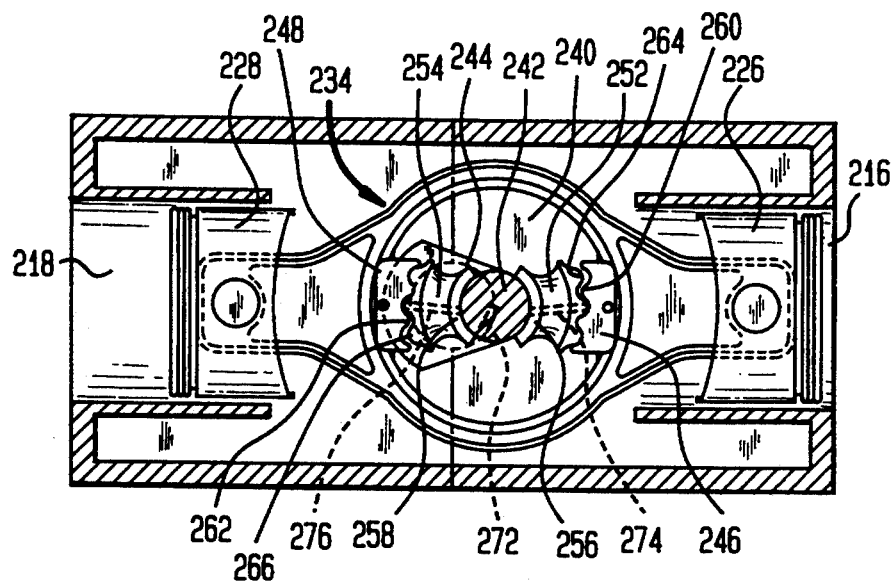
FIGS. 7-10 are a series of schematic from elevational views of the second exemplary embodiment as the motion converter of FIG. 6 is moved through a portion of its range of motion.
Figure 8:
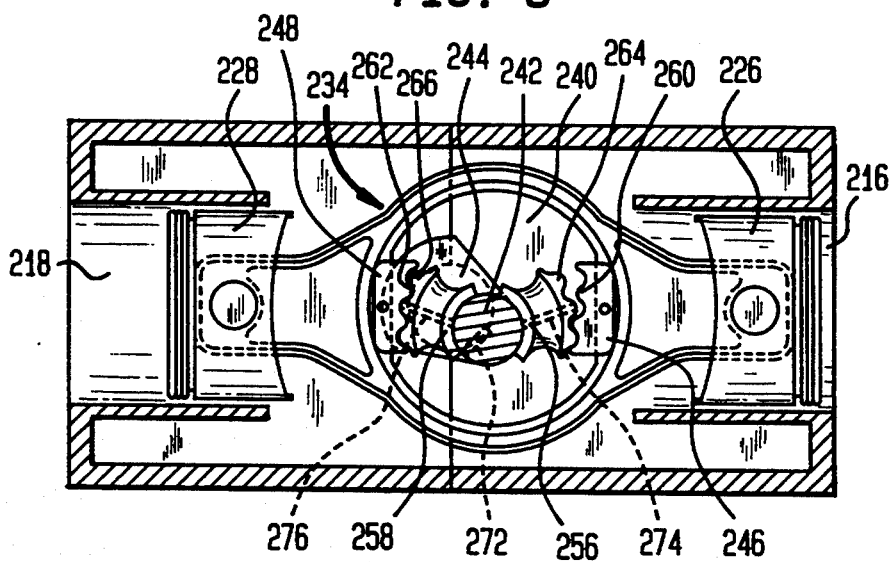
Figure 9:
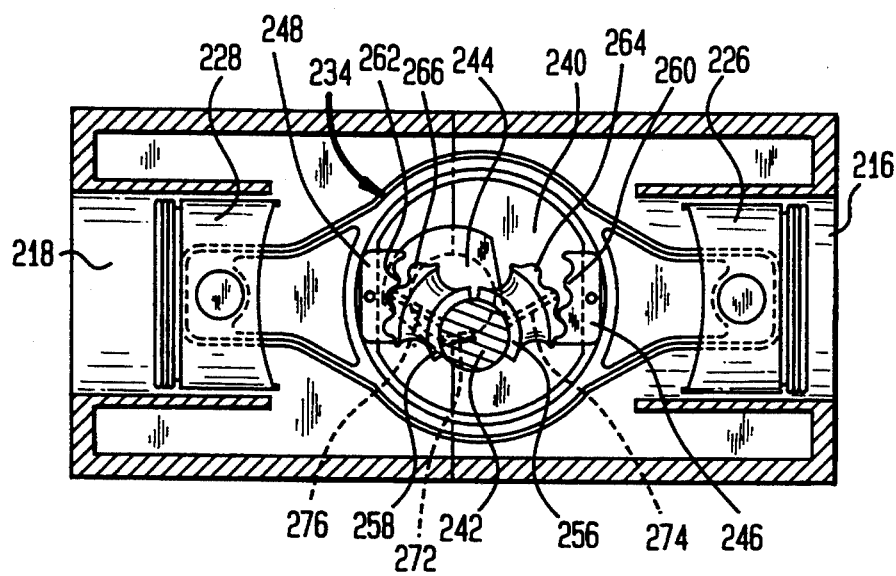
Figure 10:
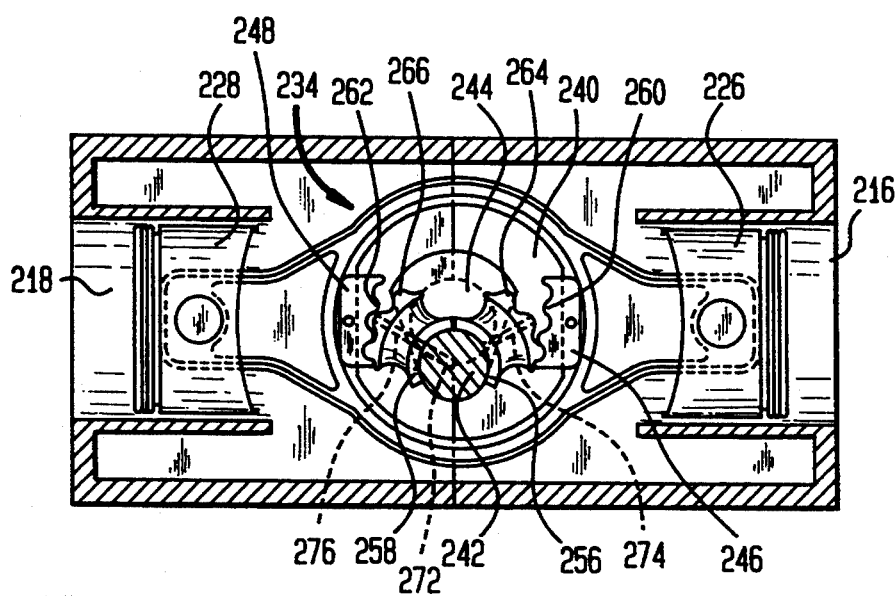

FIG. 6 shows a piston device 210 constructed in accordance with the teachings of Brackett U.S. Pat. No. 5,259,256, the specification of which is incorporated herein by reference. The piston device 210 comprises a pair of cylinder blocks 212, 214, each of which has a cylinder bore 216 and 218, respectively. The cylinder blocks 212, 214 would be joined together via opposing flanges 220, 222 by bolts etc. or by studs extending through the blocks and projecting from holes 224 for securing a cylinder head (not shown) via suitable nuts (not shown) as would be conventional in constructing cylinder blocks with opposed cylinders. The cylinder bores 216 and 218 receive corresponding pistons 226 and 228 which are mounted upon the terminal ends of extensions 230 and 232 of shuttle 234 by wrist pins 236 and 238 or other conventional means. The extensions 230 and 232 emanate from a common yoke portion 240 of the shuttle 234.

The yoke portion 240 is provided with an aperture 241 which accommodates a crankpin 242 of crankshaft 244. The internal peripheral boundary of the aperture 241, instead of simply being a smooth slot, includes a pair of bearing conjugates 246 and 248 on either side thereof. In the embodiment depicted, the bearing conjugates 246, 248 are a pair of discrete elements, each being bolted to the shuttle 234 on opposing sides of the aperture 241. Alternatively, the bearing conjugates 246, 248 could be defined by an apertured plate or plates secured to or integrated with the shuttle 234, the aperture being formed such that the interior periphery defines the bearing conjugates 246, 248. It should be appreciated that while the aperture 241 passes completely through the shuttle 234, it is possible to replace the aperture 241 with a recess or blind hole. For example, in the device shown in FIG. 6, if the yoke portion 240 were closed by a continuous metal surface on the side closest to the viewer, a recess facing toward bearing opening 250 would be formed. This recess could accommodate the free end of the crankpin 242. The use of the aperture 241 is beneficial because it permits the crankshaft 244 to project through the shuttle 234, whereby additional bearings and crankpins may be made a part thereof, such as, for example, to cooperate with another set of adjacent pistons.

The crankpin 242 has a pair of conjugate drivers 252, 254 rotatably associated therewith when the crankshaft 244 is in place in the bearing opening 250, as is more clearly shown in FIGS. 7-10. With the crankshaft 244 positioned within the opening 250 and the crankpin 242, including the conjugate drivers 252, 254, positioned within the aperture 241 of the yoke portion 240, the conjugate drivers 252, 254 mesh with the bearing conjugates 246, 248, respectively, which capture the crankpin 242 and the conjugate drivers 252, 254 therebetween. The crankpin 242 is isolated from contact with the periphery of the yoke portion 240 and instead bears upon bearing surfaces 256, 258 of the conjugate drivers 252, 254, respectively. As can be appreciated, this arrangement prevents the crankpin 242 from bearing upon the yoke portion 240 directly and permits the fitting of the crankpin 242 to the aperture 241 within manufacturing tolerances. As can be seen in FIGS. 7-10, the bearing conjugates 246, 248, which include mating profiles (i.e., undulations) 260, 262, respectively, formed on tracking surfaces thereof, and the conjugate drivers 252, 254, which include tracking profiles (i.e., undulations) 264, 266, respectively, formed on tracking surfaces thereof, mesh together in conjugation throughout the range of motion of the piston device 210; and, thus, they cooperate to form a conjugate drive mechanism as that term is defined herein.

In order to lubricate the conjugate drive mechanism, the piston device 210 is provided with a lubrication system including a gallery 268 which extends longitudinally through the crankshaft 244 and the crankpin 242 and which forms a conduit for lubricating fluid supplied under pressure from a source, such as a pump 270. The crankpin 242 has a bore 272 communicating with the gallery 268 and extending radially outwardly from the gallery 268. The conjugate drivers 252, 254 have orifices 274, 276, respectively, extending therethrough from the bearing surfaces 256, 258 to the tracking profiles 264, 266, respectively. The orifices 274, 276 are positioned such that they are alignable with the bore 272 as the crankshaft 244 rotates and the conjugate drivers 252, 254 pivot about the crankpin 242 for a purpose to be described hereinafter.

FIGS. 7-10 show the present invention at four different positions during the travel of the crankshaft 244 through ninety degrees of rotation. As the crankshaft 244 rotates, the crankpin 242 moves up and down within the yoke portion 240 relative to the axis of the cylinders 216, 218 (i.e., in a vertical direction). The horizontal component of crankpin 242 motion is translated into the rectilinear motion of the shuttle 234. The crankpin 242 is captured between the bearing surfaces 256, 258 of the conjugate drivers 252, 254 and is therefore prevented from contacting the interior periphery of the aperture 241. The conjugate drivers 252, 254 pivot about the crankpin 242 as the crankshaft 244 rotates, the bearing conjugates 246, 248 being immovable in the direction perpendicular to the linear path of the shuttle 234 and the pistons 226, 228. The conjugate drivers 252, 254 pivot in opposite directions and can therefore be said to be counter-rotating. The crankpin 242, assuming that it has an axial offset "r" from the crankshaft 244, causes a reciprocating linear motion of the shuttle of magnitude 2r, ranging from −r to +r.

As the crankshaft 244 rotates, the lubricating fluid travels through the gallery 268, is diverted to an outer surface 278 of the crankpin 242 through the bore 272 and lubricates the interface between the outer surface 278 of the crankpin 242 and the bearing surfaces 256, 258 of the conjugate drivers 252, 254. As the orifice 276 of the conjugate driver 254 comes into alignment with the bore 272 (see FIG. 10), the lubricating fluid flows from the bore 272 into the orifice 276. From the orifice 276, the lubricating fluid is delivered to the interface between the tracking profile 266 of the conjugate driver 254 and the mating profile 262 of the bearing conjugate 248. As the crankshaft 244 continues its rotating motion, the bore 272 would come into alignment with the orifice 274 of the conjugate driver 252 so that the lubricating fluid could be supplied to the interface between the tracking profile 264 of the conjugate driver 252 and the mating profile 260 of the bearing conjugate 246.

It can be appreciated that the lubrication system described hereinabove not only reduces friction at the interface between the bearing conjugates 246, 248 and the conjugate drivers 252, 254, but also at the interface between the crankpin 242 and conjugate drivers 252, 254. In addition, the lubrication system contributes in minimizing backlash and preventing scuffing by creating a thin film of lubricating fluid between the bearing conjugates 246, 248 and the conjugate drivers 252, 254, respectively, thereby compensating for inadvertent gaps and spaces resulting from manufacturing tolerances and/or wear and tear of the conjugate drive mechanism.

It should be apparent that the lubrication system described hereinabove can be configured in various alternative ways. For example, the orifices 274, 276 may extend through the conjugate drivers 252, 254 adjacent an end thereof, rather than intermediate the opposed ends of the conjugate drivers 252, 254 as shown in FIGS. 7–10. The orifices 274, 276 may also communicate with valleys between the undulations of the tracking profiles 264, 266, rather than with their peaks as shown in FIGS. 7–10. Furthermore, the lubrication system can be configured in such a way that a continuous, rather than intermittent, flow of lubricating fluid is provided to the interfaces between the conjugate drivers 252, 254 and the bearing conjugates 246, 248, respectively, or in such a way that the interface between the conjugate driver 252 and the bearing conjugate 246 and the interface between the conjugate driver 254 and the bearing conjugate 248 are lubricated simultaneously, rather than sequentially.

FIGS. 11–11b depict a modified version of the lubrication system illustrated in FIGS. 6–10. In FIGS. 11–11b, a numbering convention is employed wherein elements shown therein having a function or structure in common with a counterpart in previously discussed FIGS. 6–10 are given the same number incremented by a hundred.

Referring to FIGS. 11–11b, a conjugate driver 352 is divided into a lower member 352a and an upper member 352b. The lower member 352a is rotatably mounted on a crankpin 342. The lower member 352a has a peripheral wall 380 which extends beyond an upper surface 382 of the lower member 352a to form a socket 384. Springs 386 and a tubular nipple 388 project from the upper surface 382 within the socket 384 for purposes to be described hereinafter. As can be seen in FIG. 11, the nipple 388, which is fixedly mounted in a lower portion 374a of an orifice 374, includes an axial bore 390 and a plurality of radial holes 392 (only one of which is visible in FIG. 11) whose functions will also be described hereinafter.

The upper member 352b has a solid plug 394 which depends therefrom. The plug 394 has a size and shape which complements those of the socket 384, whereby the plug 394 is slidably received within the socket 384 with sidewalls of the plug 394 being in sealing (i.e., fluid-tight) engagement with the peripheral wall 380 of the lower member 352a. An upper portion 374b of the orifice 374 extends through the upper member 352b, including the plug 394. The upper portion 374b of the orifice 374 is sized and shaped such that it slidably receives the nipple 388 of the lower member 352a (see FIG. 11a).

As can be seen in FIG. 11a, the plug 394 has a height which is slightly less than the depth of the socket 384. Thus, when the plug 394 is in its fully retracted position within the socket 384 as shown in FIG. 11a, the plug 394 does not "bottom out" on the upper surface 382 of the lower member 352a; but, rather, the plug 394 is suspended above the upper surface 382 to create a space 396 which is in communication with the radial holes 392 of the nipple 388 for a purpose to be described hereinafter. The space 396 also accommodates the springs 386, which are fully compressed by the plug 394 when it is in its fully retracted position as shown in FIG. 11a.

As the conjugate driver 352 pivots about the crankpin 342, the springs 386 constantly urge the upper member 352b of the conjugate driver 352 against an associated bearing conjugate (not shown). If the conjugate drive mechanism becomes worn, the springs 386 function to move the upper member 352b from its retracted position depicted in FIG. 11a toward its extended position depicted in FIG. 11b, thereby compensating for such wear and, as a result, reducing backlash and scuffing. As the pressurized lubricating fluid flows from the lower portion 374a of the orifice 374 to the upper portion 374b of the orifice 374 via the nipple 388, a portion of the pressurized lubricating fluid is diverted into the space 396 through the radial holes 392 to thereby assist the springs 386 in urging the upper member 352b against its associated bearing conjugate. To maximize the force of the pressurized lubricating fluid, it may be desirable to provide an annular sealing member (not shown) between the sidewalls of the plug 394 and the peripheral wall 380 of the lower member 352a and/or to provide for a continuous flow of lubricating fluid through the orifice 374 and, hence, to the space 396. Furthermore, the lubrication system can be configured in such a way that a continuous flow of lubricating fluid is supplied to the space 396, while lubricating fluid is intermittently supplied to the interface between the conjugate driver 352 and the associated bearing conjugate. If the lubricating fluid is continuously supplied to the space 396 at a high enough pressure, then the springs 386 could be eliminated.

It should be noted that the relative movement between the upper member 352b and the lower member 352a can be achieved in various ways. For example, magnetic and/or pneumatic means may be employed in conjunction with or instead of the springs 386 and/or the pressurized lubricating fluid (i.e., the hydraulic urging means). Furthermore, the associated bearing conjugate, instead of or in addition to the conjugate driver 352, can be divided into a pair of members, one of which would have a mating profile and would be movable relative to the other member.

It will be understood that the embodiments described herein are merely exemplary and that a person skilled in the art may make many variations and modifications without departing from the spirit and scope of the invention. For example, the present invention can be employed in conjunction with the motion converters disclosed in Brackett U.S. Pat. Nos. 4,590,812 and 4,779,472, provided that such motion converters are equipped with a conjugate drive mechanism as that term is defined herein. All such modifications and variations are intended to be included within the scope of the invention as defined in the appended claims.

I claim:

1. A lubrication system for a conjugate drive mechanism of a scotch yoke type motion converter, comprising a linearly movable shuttle; a crankpin positioned within an aperture in said shuttle and rotatable in a circular path; a bearing conjugate forming a portion of a peripheral boundary of said aperture, said bearing conjugate having a trackable profile defined by an undulated surface; a conjugate driver positioned within said aperture and rotatably mounted about said crankpin, at least a portion of said conjugate driver being located between said crankpin and said bearing conjugate, said conjugate driver having a tracking profile defined by an undulated surface, said tracking profile and said trackable profile engaging each other continuously in conjugation as said crankpin rotates such that motion is transferable between said crankpin and said shuttle; and conveying means for conveying lubricating fluid from a source of pressurized lubricating fluid through said conjugate driver to a predetermined area on said undulated surface of said tracking profile when said predetermined area is in communication with a space formed between a disengaged portion of said trackable profile and a disengaged portion said tracking profile.

2. The lubrication system of claim 1, wherein said conveying means includes a gallery extending in a generally axial direction through said crankpin, said gallery communicating with said source of pressurized lubricating fluid, and a passageway extending through said conjugate driver, said passageway having an inlet provided on a surface of said conjugate driver adjacent to said crankpin and an outlet provided on said second undulated surface of said tracking profiles adjacent to said bearing conjugate.

3. The lubrication system of claim 2, wherein said conveying means includes a bore provided in a circumferential surface of said crankpin adjacent to said conjugate driver, said bore communicating with said gallery and being alignable with said inlet of said passageway so as to allow lubricating fluid to flow from said gallery to said predetermined area as said crankpin rotates.

4. The lubrication system of claim 3, wherein said conjugate driver includes a first portion positioned adjacent to said crankpin and a second portion positioned adjacent to said bearing conjugate, said second portion being movable relative to said first portion toward and away from said bearing conjugate.

5. The lubrication system of claim 4, wherein said conjugate driver includes urging means for urging said second portion toward said bearing conjugate.

6. The lubrication system of claim 5, wherein said urging means hydraulically urges said second portion toward said bearing conjugate.

7. The lubrication system of claim 6, wherein said conveying means supplies lubricating fluid to a space between said first portion and said second portion such that said second portion is movable relative to said first portion in response to the supply of lubricating fluid to said space.

8. The lubrication system of claim 7, wherein said urging means includes at least one spring positioned between said first portion and said second portion.

9. The lubrication system of claim 5, wherein said urging means includes at least one spring positioned between said first portion and said second portion.

10. The lubrication system of claim 5, wherein said urging means pneumatically urges said second portion toward said bearing conjugate.

11. The lubrication system of claim 5, wherein said urging means magnetically urges said second portion toward said bearing conjugate.

12. The lubrication system of claim 2, wherein said undulated surface of said trackable profile includes a first set of undulations and said undulated surface of said tracking profile includes a second set of undulations, said first set of undulations being in engagement with said second set of undulations.

13. The lubrication system of claim 12, wherein said outlet of said passageway is located on a peak of one of the undulations of said second set of undulations.

14. The lubrication system of claim 12, wherein said outlet of said passageway is located between peaks of two adjacent undulations of said second set of undulations.

15. The lubrication system of claim 1, wherein said conveying means conveys lubricating fluid to an interface between said conjugate driver and said crankpin.

16. The lubrication system of claim 15, wherein said conveying means intermittently conveys lubricating fluid to said predetermined area.

17. The lubrication system of claim 15, wherein said conveying means continuously conveys lubricating fluid to said predetermined area.

18. The lubrication system of claim 1, wherein the conjugate drive mechanism includes a pair of conjugate drivers rotatably mounted alongside each other on said crankpin and a pair of bearing conjugates formed on opposing portions of said peripheral boundary of said aperture, one of said pair of bearing conjugates including a first trackable profile defined by an undulated surface, another of said pair of bearing conjugates including a second trackable profile defined by an undulated surface, one of said pair of conjugate drivers including a first tracking profile defined by an undulated surface, another of said pair of conjugate drivers including a second tracking profile defined by an undulated surface, said first trackable profile being in engagement with said first tracking profile as said one conjugate driver moves back and forth along said one bearing conjugate, and said second trackable profile opposing and being offset relative to said first trackable profile, said second trackable profile being in engagement with said second tracking profile as said another conjugate driver moves back and forth along said another bearing conjugate, whereby motion is continuously transferable between said crankpin and said shuttle through said pair of conjugate drivers and said pair of bearing conjugates.

19. The lubrication system of claim 18, wherein said conveying means includes a gallery extending in a generally axial direction through said crankpin, said gallery communicating with said source of pressurized lubricating fluid, and a pair of passageways, one of said pair of passageways extending through said one conjugate driver and having an inlet provided on a surface of said one conjugate driver adjacent to said crankpin and an outlet provided on said undulated surface of said first tracking profile adjacent to said one bearing conjugate, and another of said pair of passageways extending through said another conjugate driver and having an inlet provided on a surface of said another conjugate driver adjacent to said crankpin and an outlet provided on said undulated surface of said second tracking profile adjacent to said another bearing conjugate.

20. The lubrication system of claim 19, wherein said conveying means includes a pair of bores, one of said pair of bores being provided in a circumferential surface of said crankpin adjacent to said one conjugate driver, and another of said pair of bores being provided in said circumferential surface of said crankpin adjacent to said another conjugate driver, said one bore communicating with said gallery and being alignable with said inlet of said one passageway so as to allow lubricating fluid to flow from said gallery through said one conjugate driver to a first predetermined area on said undulated surface of said first tracking profile when said first predetermined area is in communication with a first space formed between a disengaged portion of said first trackable profile and a disengaged portion of said first tracking profile as said crankpin rotates, and said another bore communicating with said gallery and being alignable with said inlet of said another passageway so as to allow lubricating fluid to flow from said gallery through said another conjugate driver to a second predetermined area on said undulated surface of said second tracking profile when said second predetermined area is in communication with a second space formed between a disengaged portion of said second trackable profile and a disengaged portion of said second tracking profile as said crankpin rotates.

21. The lubrication system of claim 18, wherein said conveying means conveys lubricating fluid to interfaces between said pair of conjugate drivers and said crankpin.

22. The lubrication system of claim 21, wherein said conveying means intermittently conveys lubricating fluid to said first predetermined area and intermittently conveys lubricating fluid to said second predetermined area.

23. The lubrication system of claim 22, wherein said conveying means sequentially conveys lubricating fluid to said first predetermined area and to said second predetermined area.

24. The lubrication system of claim 22, wherein said conveying means simultaneously conveys lubricating fluid to said first predetermined area and to said second predetermined area.

25. The lubrication system of claim 21, wherein said conveying means continuously conveys lubricating fluid to said predetermined area and continuously conveys lubricating fluid to said second predetermined area.

26. The lubrication system of claim 1, wherein the conjugate drive mechanism includes a pair of conjugate drivers and a pair of bearing conjugates formed on opposing portions of said peripheral boundary of said aperture, one of said pair of bearing conjugates including a first trackable profile defined by an undulated surface, another of said pair of bearing conjugates including a second trackable profile defined by an undulated surface, one of said pair of conjugate drivers including a first tracking profile defined by an undulated surface, another of said pair of conjugate drivers including a second tracking profile defined by an undulated surface, each of said pair of conjugate drivers being rotatable about said crankpin and independently articulatable through a selected range of degrees, said first tracking profile being in engagement with said first trackable profile, and said second tracking profile being in engagement with said second trackable profile, whereby motion is continuously transferable between said crankpin and said shuttle through said pair of conjugate drivers and said pair of bearing conjugates.

27. The lubrication system of claim 26, wherein said conveying means includes a gallery extending in a generally axial direction through said crankpin, said gallery communicating with said source of pressurized lubricating fluid, and a pair of passageways, one of said pair of passageways extending through said one conjugate driver and having an inlet provided on a surface of said one conjugate driver adjacent to said crankpin and an outlet provided on said undulated surface of said first tracking profile adjacent to said first trackable profile, and another of said pair of passageways extending through said another conjugate driver and having an inlet provided on a surface of said another conjugate driver adjacent to said crankpin and an outlet provided on said undulated surface of said second tracking profile adjacent to said second trackable profile.

28. The lubrication system of claim 27, wherein said conveying means includes a pair of bores, one of said pair of bores being provided in a circumferential surface of said crankpin adjacent to said one conjugate driver, and another of said pair of bores being provided in said circumferential surface of said crankpin adjacent to said another conjugate driver, said one bore communicating with said gallery and being alignable with said inlet of said one passageway so as to allow lubricating fluid to flow from said gallery through said one conjugate driver to a first predetermined area on said undulated surface of said first tracking profile when said first predetermined area is in communication with a first space formed between a disengaged portion of said first trackable profile and a disengaged portion of said first tracking profile as said crankpin rotates, and said another bore communicating with said gallery and being alignable with said inlet of said another passageway so as to allow lubricating fluid to flow from said gallery through said another conjugate driver to a second predetermined area on said undulated surface of said second tracking profile when said second predetermined area is in communication with a second space formed between a disengaged portion of said second trackable profile and a disengaged portion of said second tracking profile as said crankpin rotates.

29. The lubrication system of claim 26, wherein said conveying means conveys lubricating fluid to interfaces between said pair of conjugate drivers and said crankpin.

30. The lubrication system of claim 29, wherein said conveying means intermittently conveys lubricating fluid to said first predetermined area and intermittently conveys lubricating fluid to said second predetermined area.

31. The lubrication system of claim 30, wherein said conveying means sequentially conveys lubricating fluid to said first predetermined area and to said second predetermined area.

32. The lubrication system of claim 30, wherein said conveying means simultaneously conveys lubricating fluid to said first predetermined area and to said second predetermined area.

33. The lubrication system of claim 29, wherein said conveying means continuously conveys lubricating fluid to said interface between said one bearing conjugate and said one conjugate driver and continuously conveys lubricating fluid to said interface between said another bearing conjugate and said another conjugate driver.

34. The lubrication system of claim 1, wherein said shuttle reciprocates at least one piston within a mating cylinder along a linear path.

35. The lubrication system of claim 34, wherein said cylinder is that of an internal combustion engine.

36. The lubrication system of claim 35, wherein said shuttle is guided along said linear path by said piston and said cylinder.

37. The lubrication system of claim 1, wherein said conveying means conveys lubricating fluid to said space at a predetermined time during the motion of said crankpin.

38. The lubricating system of claim 37, wherein said conveying means conveys lubricating fluid to said space before said disengaged portion of said trackable profile and said disengaged portion of said tracking profile become engaged with each other.

39. A lubrication system for a conjugate drive mechanism of a scotch yoke type motion converter, comprising a linearly movable shuttle; a crankpin positioned within an aperture in said shuttle and rotatable in a circular path; a bearing conjugate forming a portion of a peripheral boundary of said aperture; a conjugate driver positioned within said aperture and rotatably mounted about said crankpin, at least a portion of said conjugate driver being located between said crankpin and said bearing conjugate, said conjugate driver and said bearing conjugate engaging each other continuously in conjugation as said crankpin rotates such that motion is transferable between said crankpin and said shuttle; and conveying means for conveying lubricating fluid from a source of pressurized lubricating fluid to an interface between said bearing conjugate and said conjugate driver, said conveying means including a gallery extending in a generally axial direction through said crankpin and a passageway extending through said conjugate driver, said gallery communicating with said source of pressurized lubricating fluid, said passageway having an inlet provided on a surface of said conjugate driver adjacent to said crankpin and an outlet provided on a surface of said conjugate driver adjacent to said bearing conjugate, said conveying means including a bore provided in a circumferential surface of said crankpin adjacent to said conjugate driver, said bore communicating with said gallery and being alignable with said inlet of said passageway so as to allow lubricating fluid to flow from said gallery to said interface between said bearing conjugate and said conjugate driver as said crankpin rotates, said conjugate driver including a first portion positioned adjacent to said crankpin and a second portion positioned adjacent to said bearing conjugate, said second portion being movable relative to said first portion toward and away from said bearing conjugate, said conjugate driver including urging means for urging said second portion toward said bearing conjugate, said urging means hydraulically urging said second portion toward said bearing conjugate, said conveying means supplying lubricating fluid to a space between said first portion and said second portion such that said second portion is movable relative to said first portion in response to the supply of lubricating fluid to said space, said urging means including at least one spring positioned between said first portion and said second portion.

40. A lubrication system for a conjugate drive mechanism of a scotch yoke type motion converter, comprising a linearly movable shuttle; a crankpin positioned within an aperture in said shuttle and rotatable in a circular path; a bearing conjugate forming a portion of a peripheral boundary of said aperture; a conjugate driver positioned within said aperture and rotatably mounted about said crankpin, at least a portion of said conjugate driver being located between said crankpin and said bearing conjugate, said conjugate driver and said bearing conjugate engaging each other continuously in conjugation as said crankpin rotates such that motion is transferable between said crankpin and said shuttle; and conveying means for conveying lubricating fluid from a source of pressurized lubricating fluid to an interface between said bearing conjugate and said conjugate driver, said conveying means including a gallery extending in a generally axial direction through said crankpin and a passageway extending through said conjugate driver, said gallery communicating with said source of pressurized lubricating fluid, said passageway having an inlet provided on a surface of said conjugate driver adjacent to said crankpin and an outlet provided on a surface of said conjugate driver adjacent to said bearing conjugate, said conveying means including a bore provided in a circumferential surface of said crankpin adjacent to said conjugate driver, said bore communicating with said gallery and being alignable with said inlet of said passageway so as to allow lubricating fluid to flow from said gallery to said interface between said bearing conjugate and said conjugate driver as said crankpin rotates, said conjugate driver including a first portion positioned adjacent to said crankpin and a second portion positioned adjacent to said bearing conjugate, said second portion being movable relative to said first portion toward and away from said bearing conjugate, said conjugate driver including urging means for urging said second portion toward said bearing conjugate, said urging means including at least one spring positioned between said first portion and said second portion.

41. A lubrication system for a conjugate drive mechanism of a scotch yoke type motion converter, comprising a linearly movable shuttle; a crankpin positioned within an aperture in said shuttle and rotatable in a circular path; a bearing conjugate forming a portion of a peripheral boundary of said aperture; a conjugate driver positioned within said aperture and rotatably mounted about said crankpin, at least a portion of said conjugate driver being located between said crankpin and said bearing conjugate, said conjugate driver and said bearing conjugate engaging each other continuously in conjugation as said crankpin rotates such that motion is transferable between said crankpin and said shuttle; and conveying means for conveying lubricating fluid from a source of pressurized lubricating fluid to an interface between said bearing conjugate and said conjugate driver, said conveying means including a gallery extending in a generally axial direction through said crankpin and a passageway extending through said conjugate driver, said gallery communicating with said source of pressurized lubricating fluid, said passageway having an inlet provided on a surface of said conjugate driver adjacent to said crankpin and an outlet provided on a surface of said conjugate driver adjacent to said bearing conjugate, said conveying means including a bore provided in a circumferential surface of said crankpin adjacent to said conjugate driver, said bore communicating with said gallery and being alignable with said inlet of said passageway so as to allow lubricating fluid to flow from said gallery to said interface between said bearing conjugate and said conjugate driver as said crankpin rotates, said conjugate driver including a first portion positioned adjacent to said crankpin and a second portion positioned adjacent to said bearing conjugate, said second portion being movable relative to said first portion toward and away from said bearing conjugate, said conjugate driver including urging means for urging said second portion toward said bearing conjugate, said urging means magnetically urging said second portion toward said bearing conjugate.

* * * * *